Oct. 25, 1960  R. J. BARTNIK  2,957,496
FLOW CONTROL VALVE
Filed Aug. 13, 1956
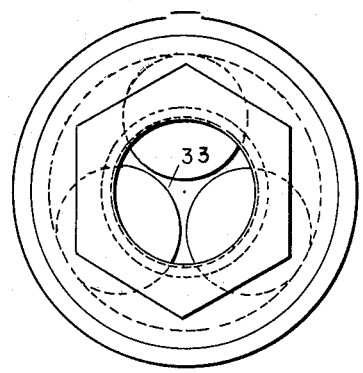
FIG. 1
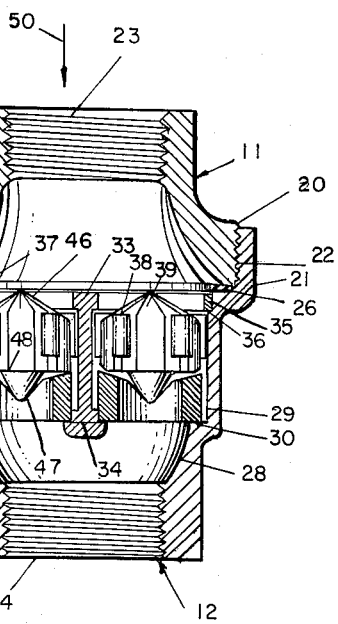
FIG. 2
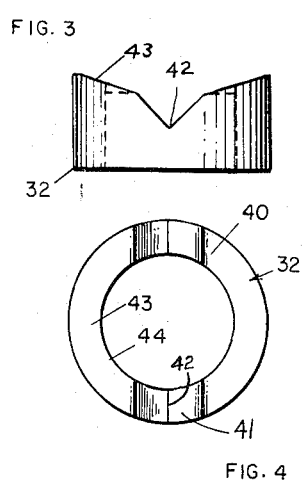
FIG. 3
FIG. 4
INVENTOR.
RAYMOND J. BARTNIK
BY Charles L. Lovercheck
Attorney

United States Patent Office 2,957,496
Patented Oct. 25, 1960

2,957,496

FLOW CONTROL VALVE

Raymond J. Bartnik, Erie, Pa., assignor to Hays Manufacturing Company, Erie, Pa., a corporation of Pennsylvania Filed Aug. 13, 1956, Ser. No. 603,552

8 Claims. (Cl. 138—43)

This invention relates to flow control devices and, more particularly, to devices for controlling the flow of fluid through a pipe line or fluid conductor in order to provide a constant flow of fluid through the device.

This invention constitutes an improvement over the flow control device disclosed in application for patent, Serial No. 415,270, filed March 4, 1954, now abandoned.

In the said application, a flow control device is disclosed wherein a single relatively thick resilient diaphragm member comprising a resilient block of material rests on a concave seat having radially disposed slots therein. The material of the diaphragm is deflected down into the slots in proportion to the force of fluid thereon. Therefore, the amount the diaphragm is deflected into the slots is proportional to fluid pressure and the effective flow area of fluid through the slots is decreased in inverse proportion to the fluid pressure exerted on the diaphragm. Therefore, a relatively constant flow of fluid from the device is possible.

The flow control device disclosed in the prior application works exceedingly well when used for low to medium flow rates; however, it has been discovered that when the flow of large volumes of fluid is desired, it is advantageous to provide a plurality of diaphragm members operating in parallel with each other. It has been also discovered that this gives a much more accurate flow control than if one large control were used. Therefore, at pressures which vary over a range which is ordinarily found in most applications, the diaphragms acting in parallel can control the flow of fluid without being stressed an appreciable amount and the control of flow to a constant rate can be more accurately maintained.

It is, accordingly, an object of this invention to provide a flow control device which is simple in construction, economical to manufacture, and simple and efficient in operation.

Another object of this invention is to provide a flow control device for controlling the rate of flow of fluid through a pipe which depends upon the compressibility of a resilient material into a groove to regulate the control of fluid therethrough, and a plurality of diaphragm members are disposed in side by side relation whereby fluid flowing through the flow control is equal to the sum of the fluid flowing from each of the control devices.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit thereof or sacrificing any of the advantages of the invention.

In the drawing:

Fig. 1 is a top view of a flow control device according to the invention;

Fig. 2 is a longitudinal cross sectional view of the flow control device shown in Fig. 1;

Fig. 3 is a side view of one of the seat members of the flow control device; and Fig. 4 is a top view of the seat member shown in Fig. 3.

Now with more specific reference to the drawing, a flow control device is shown having a hollow body 10 made up of an inlet adapter 11 and an outlet adapter 12. The inlet adapter 11 is threaded at 20. The outlet adapter 12 has a flange 21 which is internally threaded at 22 to receive the threads 20 on the inlet adapter 11. The inlet adapter 11 has internal threads 23 by which it may be attached to an inlet pipe line and the outlet adapter 12 has internal threads 24 which may be attached to an outlet pipe line. The outlet adapter 12 has a shoulder 25 adjacent the threaded flange 21 and a washer 26 forms a seal between the shoulder 25 and the end of the inlet member 11.

The outlet member 12 has an internal hollow 28 which is counterbored at 29, leaving a shoulder 30 which supports hollow cylindrical orifice plates 32. A central web 33 is integral with the body 10 of the outlet adapter 12 and forms a partition therein and has a shoulder 34 thereon which is in alignment with the shoulder 30 of the outer portion of the body 10. The shoulders 34 and 30 support the bottom portions of the orifice plates 32.

A counterbore 35 defines a shoulder 36 which supports a ring 37. The ring 37 is engaged by the overhanging portion of the resilient washer 26 to hold it in position. The ring 37 abuts against the upper ends of outwardly extending ribs 38 of diaphragms 39 and thus limits the upward movement of the diaphragm members 39 above the orifice plates 32. The orifice plates 32 are in the form of hollow cylinders each having a converging upper surface 40 and a radially disposed V-slot 41 formed therein. The slots 41 are deepest at an inner portion 42 and terminate in a shallow portion 43 adjacent an inner surface 44 of the orifice plates 32.

The diaphragms 39 are relatively thick generally cylindrical members made of resilient material and each having an upper conical portion 46 and a reduced size conical portion 47 on the lower ends thereof which are integral with a generally flat lower end 48. The lower end surface 48 rests on the surface 40 adjacent the outer peripheral edge thereof and the ribs 38 locate the diaphragm members 39 generally concentric with the end of the cylindrical orifice plate 32. The conical end members 46 and 47 cause the fluid to flow around the diaphragms 39 in more streamlined fashion and also cause the fluid to center the diaphragms 39 along with the ribs 38.

When the flow control is assembled as shown in Fig. 2, fluid flow will be in the direction of arrow 50 and it will flow through the inlet adapter 11 and through the slots 41 under the diaphragms 39. Then as the pressure in the inlet 11 increases, the diaphragms 39 will be forced downward and be deformed into the slots 41. Therefore, the flow through the slots 41 will be restricted generally in proportion to the pressure of the fluid on top of the diaphragms 39.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A flow control comprising a hollow body having a single inlet and an outlet, a web in said hollow body integral therewith forming a partition between said inlet and said outlet and defining a plurality of spaced flow passages therethrough, each said flow passage being counterbored, a hollow cylindrical orifice plate supported in each said counterbore, each said orifice plate having a transverse slot in the upstream end thereof presented in an upstream direction, and a cylindrical relatively thick resilient diaphragm having a convex upstream surface supported on said slotted ends of said orifice plates, one end of said diaphragms being flat and resting on said slotted end, said diaphragm being compressible by fluid pressure on the upstream side thereof into said slot to reduce flow therethrough in proportion to the fluid pressure on said diaphragm.

2. The flow control recited in claim 1 wherein said flat surfaces of said diaphragm each have a conical member disposed thereon concentric therewith and disposed in the hollow in said orifice plate.

3. The flow control recited in claim 2 wherein said diaphragms each have spaced outwardly extending ribs on the outside thereof.

4. A flow control comprising a hollow body having an inlet adapter and an outlet adapter, means for attaching said inlet adapter to said outlet adapter with a sealing washer therebetween, said outlet adapter having a counterbore concentric with the opening therethrough, a diaphragm retainer ring disposed in said counterbore, a web in said outlet adapter forming a partition in the hollow end thereof and having spaced bores therethrough, said bores in said web each being counterbored and presenting a shoulder to the upstream side thereof, hollow cylindrical orifice plates on said shoulders in said bores through said web, the upstream side of each said orifice plate tapering inwardly toward the center thereof to define a concave surface and having radially extending slots therethrough, and a diaphragm in each said bore through said web, one end of each said diaphragm being flat and supported on one of said concave surfaces, the other end surface being convex, each said diaphragm being adapted to be limited in its upstream movement by engagement with said diaphragm retainer ring.

5. The flow control recited in claim 4 wherein each said diaphragm has a conical, axially outwardly extending member on the flat surface thereof and disposed concentric with said orifice plates.

6. The flow control recited in claim 5 wherein outwardly extending ribs are disposed on the periphery of each said diaphragm whereby said diaphragm is located in said bores.

7. The flow control recited in claim 6 wherein a second counterbore is provided in said body, a ring is disposed in said second counterbore, said ring extending inwardly and abutting against one end of said ribs to hold said diaphragms in position.

8. A flow control comprising a hollow body having an inlet adapter and an outlet adapter, means for attaching said inlet adapter to said outlet adapter with a sealing washer therebetween, said outlet adapter having a counterbore concentric with the opening therethrough, a diaphragm retainer ring disposed in said counterbore, a web in said outlet adapter forming a partition in the hollow thereof and having spaced bores therethrough, said bores in said web each being counterbored and presenting a shoulder to the upstream side thereof, hollow cylindrical orifice plates on said shoulders in said bores through said web, the upstream side of each said orifice plate tapering inwardly toward the center thereof to define a concave surface and having radially extending slots therethrough, and a diaphragm in each said bore through said web, one end of each said diaphragm being flat and supported on one of said concave surfaces, the other end surface being convex, each said diaphragm being adapted to be limited in its upstream movement by engagement with said diaphragm retainer ring, each said diaphragm having a conical point extending into the hollow of one of said orifice plates.

References Cited in the file of this patent

UNITED STATES PATENTS

| | | |
|---|---|---|
| 2,454,929 | Kempton | Nov. 30, 1948 |
| 2,460,647 | Miller | Feb. 1, 1949 |
| 2,554,790 | Miller | May 29, 1951 |
| 2,762,397 | Miller | Sept. 11, 1956 |
| 2,772,833 | Chace | Dec. 4, 1956 |
| 2,853,264 | Lodge | Sept. 23, 1958 |